United States Patent
Clark et al.

(10) Patent No.: US 9,886,296 B2
(45) Date of Patent: Feb. 6, 2018

(54) MANAGING HYPERVISOR WEIGHTS IN A VIRTUAL ENVIRONMENT

(71) Applicant: International Business Machines Corporation, Armonk, NY (US)

(72) Inventors: Lawrence E. Clark, Cary, NC (US); Rahul Ghosh, Morrisville, NC (US); Douglas A. Larson, Raleigh, NC (US); Jose A. Nativio, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 14/556,303

(22) Filed: Dec. 1, 2014

(65) Prior Publication Data

US 2016/0154660 A1     Jun. 2, 2016

(51) Int. Cl.
*G06F 9/455* (2006.01)
*G06F 9/50* (2006.01)
(Continued)

(52) U.S. Cl.
CPC ...... *G06F 9/45558* (2013.01); *G06F 9/45533* (2013.01); *G06F 9/50* (2013.01);
(Continued)

(58) Field of Classification Search
CPC .. G06F 9/455; G06F 9/45533; G06F 9/45558; G06F 9/45579; G06F 9/45583;
(Continued)

(56) References Cited

U.S. PATENT DOCUMENTS 6,968,323 B1\* 11/2005 Bansal ................. G06Q 10/06
                                                              370/230
8,209,682 B2\*  6/2012 Cherkasova ......... G06F 9/5027
                                                              718/1
(Continued)

FOREIGN PATENT DOCUMENTS

WO     2013048986 A1     4/2013

OTHER PUBLICATIONS

Alhamad, M., SLA-Based Trust Model for Cloud Computing, PhD dissertation, Curtin University, Nov. 2011, 202 pages,[retrieved on Sep. 6, 2017], Retrieved from the Internet: <URL:https://www.researchgate.net/publication/220909642_SLA-Based_Trust_Model_for_Cloud_Computing>.\*

(Continued)

*Primary Examiner* — Geoffrey St Leger
(74) *Attorney, Agent, or Firm* — Nathan M. Rau (57) ABSTRACT

A computer implemented method and system for managing resources available to an application in a shared pool of configurable network computing resources is provided. The method includes receiving, by a metric collector, one or more service level metrics correlated with one or more time intervals. The service level metrics are converted to hypervisor weights and a hypervisor is configured to allocate computing resources to a virtual machine according to the hypervisor weights. In response to translating and implementing the hypervisor weights, a dynamic cost model is created. The cost model is correlated with chosen service level metrics as well as with the duration of time a chosen service level metric is implemented.

18 Claims, 8 Drawing Sheets

(51) Int. Cl.
*G06F 11/34* (2006.01)
*H04L 12/24* (2006.01)

(52) U.S. Cl.
CPC ........ *G06F 9/5083* (2013.01); *H04L 41/5029* (2013.01); *G06F 9/5011* (2013.01); *G06F 9/5016* (2013.01); *G06F 11/3433* (2013.01); *G06F 2009/4557* (2013.01); *G06F 2009/45583* (2013.01)

(58) Field of Classification Search
CPC ........ G06F 9/50; G06F 9/5005–9/5016; G06F 9/5027; G06F 9/5077
USPC .................................................... 718/1, 104
See application file for complete search history.

(56) References Cited

U.S. PATENT DOCUMENTS

| | | | | |
|---|---|---|---|---|
| 8,230,434 B2* | 7/2012 | Armstrong | ............ | G06F 9/5077 713/1 |
| 8,583,799 B2* | 11/2013 | Podila | ............ | G06F 9/5011 709/224 |
| 8,584,128 B1* | 11/2013 | Don | ............ | G06F 9/5011 718/100 |
| 8,645,529 B2* | 2/2014 | Doddavula | ............ | H04L 67/34 709/223 |
| 8,843,925 B1* | 9/2014 | Beda | ............ | G06F 9/5077 718/1 |
| 8,902,821 B2* | 12/2014 | Wang | ............ | H04W 28/26 370/252 |
| 9,178,763 B2* | 11/2015 | Gmach | ............ | H04L 41/0823 |
| 9,424,059 B1* | 8/2016 | Sivaprakasam | ............ | H04L 65/80 |
| 2002/0059427 A1* | 5/2002 | Tamaki | ............ | G06F 9/5027 709/226 |
| 2007/0165803 A1* | 7/2007 | Duan | ............ | H04L 12/14 379/114.03 |
| 2007/0234365 A1* | 10/2007 | Savit | ............ | G06F 9/505 718/104 |
| 2008/0028411 A1* | 1/2008 | Cherkasova | ............ | G06F 9/5027 718/104 |
| 2008/0077927 A1* | 3/2008 | Armstrong | ............ | G06F 9/5077 718/104 |
| 2009/0119673 A1* | 5/2009 | Bubba | ............ | G06F 9/50 718/104 |
| 2009/0310613 A1* | 12/2009 | Wang | ............ | H04W 28/26 370/400 |
| 2011/0209146 A1* | 8/2011 | Box | ............ | G06F 9/5077 718/1 |
| 2011/0296052 A1 | 12/2011 | Guo et al. | | |
| 2012/0005657 A1* | 1/2012 | Huber | ............ | G06F 9/4843 717/127 |
| 2012/0016721 A1* | 1/2012 | Weinman | ............ | G06Q 10/06 705/7.35 |
| 2012/0041858 A1* | 2/2012 | Lewis | ............ | G06Q 10/04 705/34 |
| 2012/0089726 A1* | 4/2012 | Doddavula | ............ | H04L 67/34 709/224 |
| 2012/0290725 A1* | 11/2012 | Podila | ............ | G06F 9/5011 709/226 |
| 2013/0097601 A1* | 4/2013 | Podvratnik | ............ | G06F 9/5027 718/1 |
| 2013/0155961 A1* | 6/2013 | Brunnenmeyer | .. | H04B 7/18584 370/329 |
| 2013/0223612 A1* | 8/2013 | Flockhart | ............ | H04M 3/5175 379/265.02 |
| 2013/0275975 A1* | 10/2013 | Masuda | ............ | G06F 9/5077 718/1 |
| 2013/0304904 A1 | 11/2013 | Mouline et al. | | |
| 2014/0040895 A1* | 2/2014 | Peng | ............ | G06F 9/45533 718/1 |
| 2014/0169788 A1* | 6/2014 | Hussain | ............ | H04L 12/00 398/43 |
| 2014/0189684 A1 | 7/2014 | Zaslaysky et al. | | |
| 2014/0282503 A1* | 9/2014 | Gmach | ............ | H04L 41/0823 718/1 |
| 2014/0282586 A1* | 9/2014 | Shear | ............ | G06F 9/5072 718/104 |
| 2015/0089496 A1* | 3/2015 | Thankappan | ......... | G06F 9/5005 718/1 |
| 2015/0131488 A1* | 5/2015 | Perez Martinez | .. | H04L 41/5025 370/259 |
| 2015/0261578 A1* | 9/2015 | Greden | ............ | G06F 9/5044 718/1 |
| 2015/0261647 A1* | 9/2015 | Sakaki | ............ | G06F 9/50 703/21 |
| 2015/0317188 A1* | 11/2015 | Magerramov | ............ | G06F 9/50 718/104 |
| 2016/0019088 A1* | 1/2016 | Garza | ............ | G06F 9/00 718/1 |

OTHER PUBLICATIONS

Wang, Y., Performance Controlled Power Optimization for Virtualized Internet Datacenters, PhD dissertation, University of Tennessee, 2011, 161 pages, [retrieved on Oct. 24, 2016], Retrieved from the Internet: <URL:http://trace.tennessee.edu/cgi/viewcontent.cgi?article=2215&context=utk_graddiss>.*

Wang, Y., et al., Virtual Batching: Request Batching for Energy Conservation in Virtualized Servers, 18th International Workshop on Quality of Service (IWQoS), Jun. 16-18, 2010, 9 pages, [retrieved on Oct. 24, 2016], Retrieved from the Internet: <URL:http://ieeexplore.ieee.org/>.*

Mell, P., et al., "The NIST Definition of Cloud Computing", Recommendations of the National Institute of Standards and Technology. NIST Special Publication 800-145, Sep. 2011. 7 pages.

Subramanian S., et al., "An Adaptive Algorithm for Dynamic Priority Based Virtual Machine Scheduling in Cloud", IJCSI International Journal of Computer Science Issues, vol. 9, Issue 6, No. 2, Nov. 2012. pp. 397-402. ISSN (Online): 1694-0814. Copyright (c) 2012 International Journal of Computer Science Issues.

* cited by examiner

MANAGING HYPERVISOR WEIGHTS IN A VIRTUAL ENVIRONMENT

BACKGROUND

This disclosure relates generally to computer systems and, more particularly, managing hypervisor weights of a virtual machine within a shared pool of configurable network computing resources. The number of applications for virtual machine usage is growing at an increasing rate. However, determining how to distribute available computing power among virtual machines competing for host resources can be burdensome. As the number of applications increase, the need to efficiently manage computing resources may also increase.

SUMMARY

Aspects of the disclosure may include a computer implemented method and system for managing resources available to an application in a shared pool of configurable network computing resources. The method can include receiving, by a metric collector, a first and second service level metric for an application deployed on one of a plurality of computing nodes and a first and second parameter specifying a first time period. A metric translator may convert the first and second service level metrics to hypervisor weights. In response to translating the first and second service level metrics to hypervisor weights, a hypervisor may be configured to allocate computing resources to a virtual machine according to the hypervisor weights. The hypervisor may be configured to allocate computing resources to the virtual machine according to the first hypervisor weight for the first time period and according to the second hypervisor weight for the second time period.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure include a computer implemented method for managing resources available to an application in a shared pool of configurable network computing resources. The computer implemented method and system may allow a cloud user to control with granularity the cloud infrastructure based on the needs of the user. The method and system may be used to create a dynamic cost model based upon the implementation of hypervisor weights converted from service level metrics and an associated period of time.

In a virtualized environment, it is desirable to maximize the number of guest virtual machines running in the physical host in order to achieve a more effective utilization of the hardware resources. However, when multiple virtual machines concurrently run on the same host, they compete for available physical resources within the host, including the central processing unit, network adapter, disk and memory. In order to provide some level of prioritization, hypervisors allow the assignment of a weight to each virtual machine. The weight is used to control how the available computing power is distributed among the virtual machines competing for resources.

Cloud providers typically allow customers to choose a level of service (e.g., Platinum, Gold, Silver, etc.) or priority (e.g., High, Medium, Low) associated with the virtual machine the customer is deploying in order to distinguish its performance when competing for resources. In most cases, the level of service typically translates to an amount of resource capacity given to a virtual machine. Furthermore, the level of priority is correlated with hypervisor weights. Therefore, a cloud user may be completely unaware about the underlying hypervisor technology that is used to mitigate the resource contention among the virtual machines. Finally, the level of service and priority are both fixed values that are decided at the time of deployment or at the time of service selection. However, business priorities and conditions may change over time and such one-time fixed assignments may not provide optimal service quality. In addition, a user may want to control the infrastructure based on their needs, necessitating a user-driven, fine-grained approach that can adapt with time.

Aspects of the disclosure include a computer implemented method and system for managing resources available to an application in a shared pool of configurable network computing resources. The method may receive, by a metric collector, a first service level metric for an application deployed on one of a plurality of computing nodes and a first parameter specifying a first time period. A metric translator may convert the first service level metric to a first hypervisor weight. In response to translating the first service level metric to a first hypervisor weight, a hypervisor may be configured to allocate computing resources to a virtual machine according to the first hypervisor weight. In embodiments, computing resources may include usage of devices such as a central processing unit, a network interface controller, disk space, memory, and an input/output mechanism. When the hypervisor is configured according to the first hypervisor weight, resources may be allocated to the application running in the virtual machine for the first time period.

Aspects of the disclosure include a computer implemented method and system for managing resources available to an application for time intervals in a shared pool of configurable network computing resources. The method may receive, by a metric collector, a second service level metric and a second parameter specifying a second time period. In certain embodiments, the service level metrics may include computing node utilization and uptime availability. A metric translator may convert the second service level metric to a second hypervisor weight. In response to translating the service level metric to a hypervisor weight, a dynamic cost model may be generated. When the second service level metric is converted to a second hypervisor weight, a hypervisor may be configured to allocate computing resources to the virtual machine according to the second hypervisor weight. In embodiments, the hypervisor may be configured to allocate computing resources to the virtual machine according to the first hypervisor weight for the first time period and according to the second hypervisor weight for the second time period.

Figure 1:
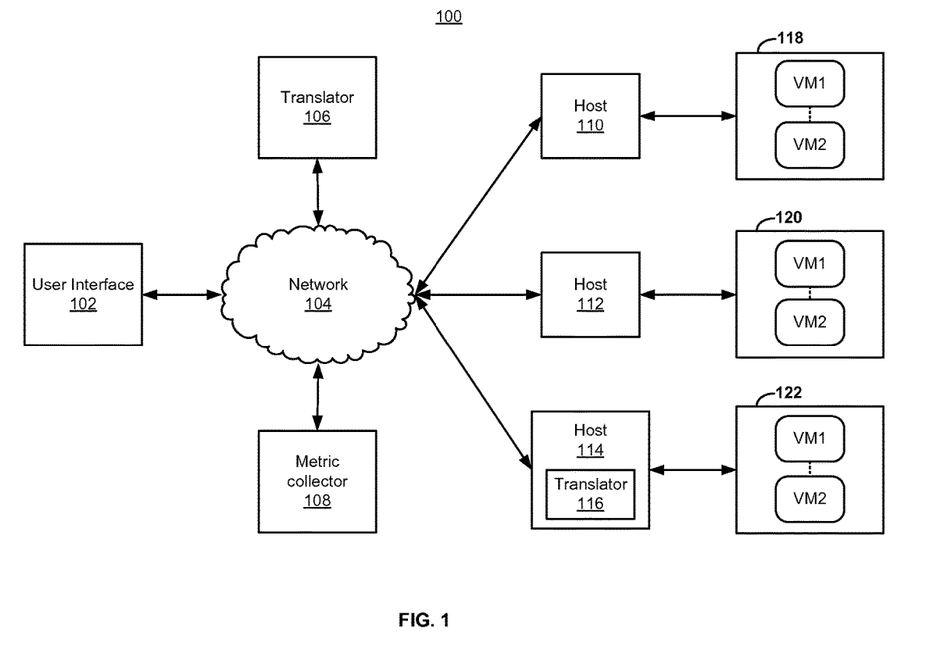
FIG. 1 depicts a high level diagram illustrating an example system for managing resources available to an application in a shared pool of configurable network computing resources according to various embodiments.

FIG. 1 is a high level diagram illustrating an example system 100 for controlling resources available to an application in a shared pool of configurable network computing resources. The system 100 may include a user interface 102, a network 104, a translator 106, a metric collector 108, a plurality of host machines 110, 112, 114, a translator 116 within a host machine, and a plurality of virtual machines 118, 120, and 122.

The user interface 102 may include a dashboard running on a graphical user interface. The user interface 102 may be run on a personal computer or similar device. Through the user interface 102, a user may input a first service level metric for an application deployed on one of a plurality of computing nodes. In embodiments, a user at the user interface 102 may input a first parameter specifying a first time period. Various embodiments allow for the use of multiple time periods, where the time periods correspond with the implementation of certain service level metrics at different intervals. Accordingly, the number of time periods can be set according to the particular implementation of the service level metrics. The service level metrics inputted in the user interface 102 may be sent over a network 104 and received by a metric collector 108. The network 104 may be in communication (e.g., constant/continuous communication) with the user interface 102.

The metric collector 108 may store the inputted service level metrics from the user interface 102. In embodiments, the metric collector 108 may store data associated with a user and service level metrics chosen by the user to generate a profile. In embodiments, the metric collector 108 may be a multi-dimensional array. The profile may be used in future selections that take place within the user interface 102. For example, if a user chooses a specific service level metric and a corresponding time period, data collected by the metric collector 108 may be accessed by the user interface 102 in the future to provide a user with an option to implement the same service level metric and corresponding time period as before. The metric collector 108 may send the service level metrics through the network 104 to a translator 106. The translator 106 may convert service level metrics to corresponding hypervisor weights. The hypervisor weights converted by the translator 106 may be implemented on a plurality of host machines 110, 112, and 114. In embodiments, a translator 106 may be within a host machine, as is shown by example in the host machine 114 and the translator 116.

The hypervisor weights implemented on the host machines 110, 112, and 114 are assigned to virtual machines 118, 120, and 122 respectively. The virtual machines 118, 120, and 122 may receive resources within a virtual environment in accordance with the respective hypervisor weights implemented on the host machines 110, 112, and 114. The host machines 110, 112, and 114 may communicate with both the network 104 and the virtual machines 118, 120, and 122. In embodiments, a user may input a first service level metric and a first parameter specifying a first time period as well as a second service level metric and a second parameter for a second time period (e.g., high performance bandwidth for one hour, PARAM_0060). When the first time period is reached, the host machines 110, 112, and 114 may dynamically reconfigure the virtual machines 118, 120, and 122 in accordance with the second service level metric. In certain embodiments, a host machine may reconfigure the virtual machine in accordance with subsequent service level metrics before a first time period is reached.

Figure 2:
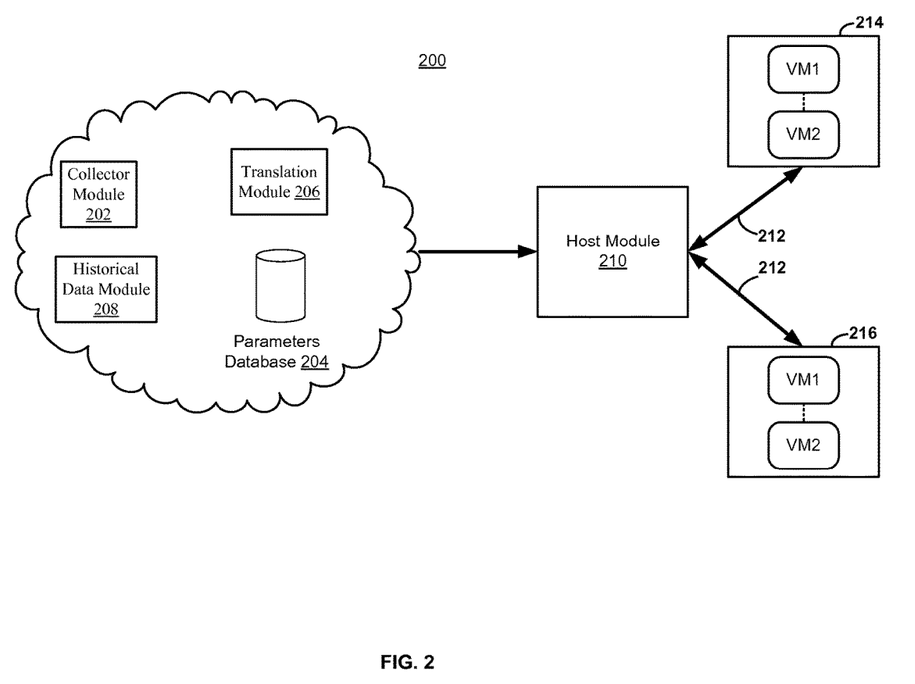
FIG. 2 illustrates an example system for implementing hypervisor weights within a virtual environment according to embodiments.

FIG. 2 illustrates an example system 200 according to embodiments. The system 200 may include a collector module 202, a parameters module 204, a translation module 206, a historical data module 208, a host module 210, a communication 212, and a plurality of virtual machines 214 and 216.

In system 200, a collector module 202 may receive a set of service level metrics and a set of parameters specifying time periods for the service level metrics from a user interface. The user interface may work in a manner similar to that described in FIG. 1 for the user interface 102. The parameters module 204 may be accessed by the user interface. The parameters module 204 may include a databank comprising metrics related to virtual machine resource usage. In certain embodiments, metrics within the module 204 may include but are not limited to high performance, high reliability, and low cost. For example, a user may desire to run a virtual machine with metrics associated with storage, memory capacity and bandwidth. In various embodiments, the collector module 202 may include a user interface. In the collector module 202, a user may access the parameters module 204 and select metrics for storage, memory capacity, and bandwidth, as well as different time periods for implementing specific metrics running on a virtual machine. The collector module 202 may be in communication with a historical data module 208. The historical data module 208 may collect data associated with specific users and the metrics chosen by the specific users to create a profile (e.g., predetermined settings based upon previous usage). The collector module 202 may send the service level metrics to a translation module 206. The translation module 206 may convert the specific service level metrics to corresponding hypervisor weights.

Once the hypervisor weights are converted within the translation module 206, the translation module 206 may send the specified hypervisor weights to a host module 210. The host module 210 can be a computer. The host module 210 may communicate with the virtual machines 214 and 216 using communication 212. The virtual machines 214 and 216 may receive hypervisor resources in conjunction with the assigned hypervisor weights using communication 212. When a first time period for a first set of service level metrics lapses, the host module 210 may communicate with the virtual machines 214 and 216 to dynamically implement a second set of service level metrics for a second time period.

Figure 3:
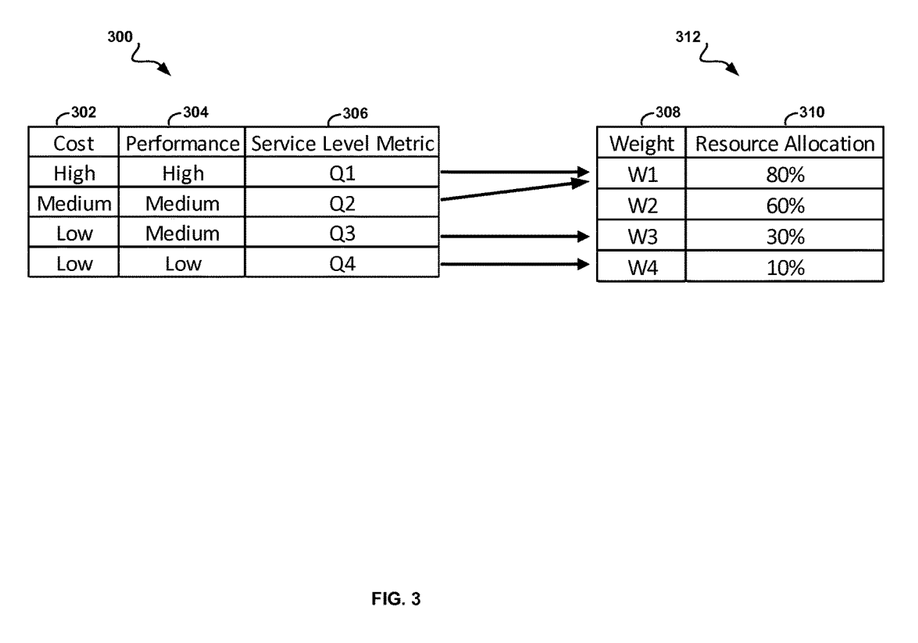
FIG. 3 illustrates an example of translating service level metrics to hypervisor weights.

FIG. 3 illustrates an example of translating service level metrics to hypervisor weights, which may occur using a metric collector. The columns 302, 304, and 306 entitled cost, performance, and service level metric in table 300 represent metrics a user may initially input into a system. For example, these metrics may be selected and inputted in the collector module 202 in FIG. 2. The cost column 302 is an example generic list of the various amounts a user may spend with chosen metrics. The cost column 302 may include specific resource benefits or burdens for different services. The various levels, in this figure, are related to the performance column 304. In embodiments, the performance column 304 may contain metrics such as memory, bandwidth, reliability, and storage. The service level metric column 306 lists the associated metrics as they relate to the performance column 304 and the cost column 302. For example, a user may desire to select a specific amount of bandwidth for use within a virtual machine. If the user desired a high availability of bandwidth, this may correspond with a higher cost or burden. Therefore, a user desiring a high availability of bandwidth may select the respective service level metric, Q1, and may be aware of the resource benefits or burdens associated with the service level metric Q1. In another example, the same user may additionally desire a certain amount of memory to use within a virtual machine. If the user desired only a small amount of memory, this may correspond with a lower cost. Therefore, a user desiring a small amount of memory may select the respective service level metric, Q4, and may be aware of the resource benefits or burdens associated with the service level metric Q4.

A conversion may occur between tables 300 and 312 such that the selected service level metrics are converted to hypervisor weights. The conversion may be user defined. In various embodiments, the conversion may include an algorithm which generates converted hypervisor weights from service level metrics. For example, a user may select several service level metrics and rank them in order of their importance to the user. The algorithm, which may include data pertaining to the current status of the hypervisor and the performance requirements necessary for implementing the desired service level metrics, may map the highest weight to the most important user defined metric and may map the second highest weight to the second most important user defined metric.

Columns 308 and 310, entitled weight and resource allocation in table 312 represent the converted hypervisor weights and the resource allocation associated with each hypervisor weight. The weight column 308 and the resource allocation column 310 may change depending upon the service selected by the user. The resource allocation column 310 represents the amount of computer power that may be allocated to a specified service. In the example above, a user desired high availability of bandwidth and a small amount of memory. For the bandwidth, a conversion may be performed such that the service level metric Q1 in the service level metric column 306 is converted to a Weight W1 in the weight column 308. The high performance bandwidth and the associated costs may result in an 80% allocation of bandwidth resources to the virtual machine of the user from the host machine. Likewise, for the memory, a conversion may be performed such that the service level metric Q4 in the service level metric column 306 is converted to a Weight W4 in the weight column 308. The small amount of memory and the associated costs may result in a 10% allocation of memory resources to the virtual machine of the user from the host machine. In certain embodiments, both of the weights desired by the user in the example above, W1 and W4, may be implemented simultaneously.

In certain embodiments, a user selection of a particular service level metric may be limited by the service to be provided or the amount of resources available not currently allocated for other virtual machines running within the plurality of computing nodes. For example, a user may select from the performance column 304 a moderate amount of storage space to be implemented within a virtual machine. The moderate amount of storage space would correspond with Q2 from the service level metric column 306. If the desired amount of storage represents a significant portion of the remaining resources not currently allocated for other virtual machines, the service level metric Q2 may convert to a heavier weight W1 in the weight column 308.

Figure 4:
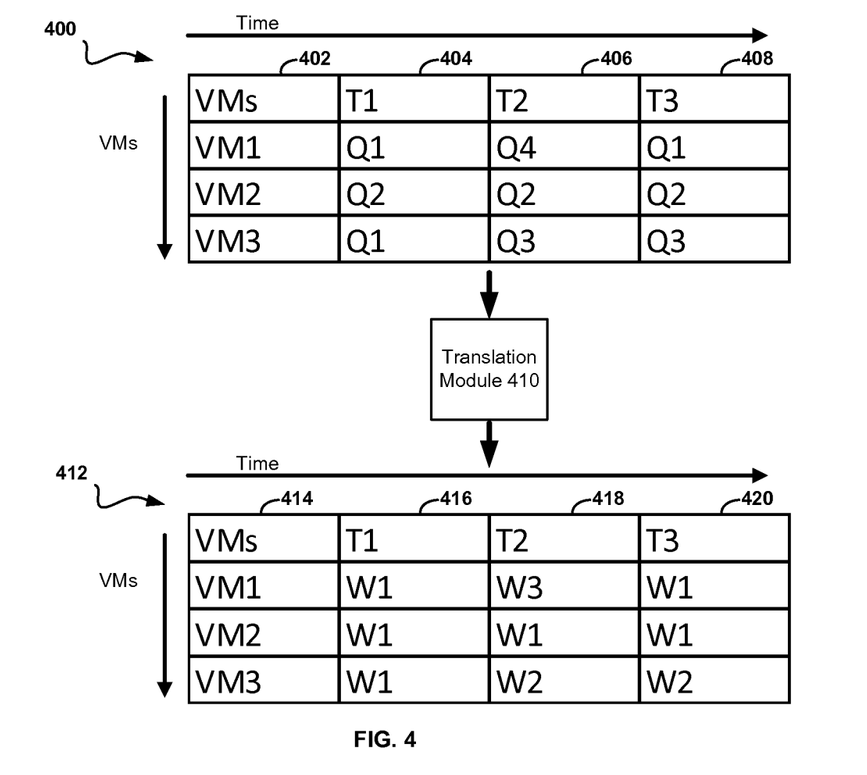
FIG. 4 illustrates an example of a schedule to generate hypervisor weights for a plurality of virtual machines over time.

FIG. 4 illustrates an example of a schedule to generate hypervisor weights for a plurality of virtual machines over time. The schedule 400 represents service level metrics chosen by a user for periods of time for a plurality of virtual machines running in a shared pool of configurable network computing resources. In embodiments, the schedules 400 and 412 may be displayed on a graphical user interface. A user may input the service level metrics and the respective time periods into the table 400 through the graphical user interface before the virtual machine is deployed. As the virtual machine is deployed, it may receive hypervisor resources as they relate to the service level metrics. In certain embodiments, the schedules 400 and 412 may be modified after the virtual machine has been deployed. Various embodiments allow for the use of multiple time periods, where the time periods correspond with the implementation of certain service level metrics at different intervals. Accordingly, the number of time periods can be set according to the particular implementation of the service level metrics. The length of the time periods may be user defined. In certain embodiments, the length of the periods of time may be predetermined.

For example, the VM1 in the virtual machine column 402 corresponds to a service level metric Q1 in the first time period column 404. Thus, for the VM1, a service level metric Q1 may be implemented and available for the first time period T1. Similarly, the VM1 in the virtual machine column 402 corresponds to a service level metric Q4 in the second time period column 406. The service level metric Q4 may be implemented and available for the second time period T2 within the VM1. Finally, the VM1 in the virtual machine column 402 corresponds with a service level metric Q1 in the third time period column 408. The service level metric Q1 may be implemented and available for the third time period T3 within the VM1. In various embodiments, a user may change the service level metric after deploying the virtual machine without reconfiguring the virtual machine or incurring downtime.

A conversion of the service level metrics to hypervisor weights may be performed at a translation module 410. The conversion may be performed in a manner similar to the conversion discussed above in FIG. 3. The schedule 412 represents the converted service level metrics into hypervisor weights as they correspond to time period intervals. For example, the VM1 in the virtual machine column 414 corresponds with a hypervisor weight W1 in the first time period column 416. Thus, for the VM1, a service level metric Q1 may be converted to a hypervisor weight W1 to be implemented and available for the first time period T1. Similarly, the VM1 in the virtual machine column 414 corresponds with a hypervisor weight W4 in the second time period column 418. Accordingly, for the VM1, a service level metric Q4 may be converted to a hypervisor weight W4 to be implemented and available for the second time period T2. Finally, the VM1 in the virtual machine column 414 corresponds with a hypervisor weight W1 in the third time period column 420. Therefore, for the VM1, a service level metric Q1 may be converted to a hypervisor weight W1 to be implemented and available for the third time period T3. In various embodiments, if a user wishes to change a service level metric after the virtual machine has been deployed, they may do so by ignoring the workload demands within the virtual machine.

In practice, various embodiments of the invention and the schedules 400 and 412 may work as follows. Through a graphical interface, a user may receive a blank schedule similar to schedules 400 and 412 in FIG. 4 and described above. The user may receive a proposed predetermined schedule based upon a user profile, such as the profile described in FIG. 1. The graphical user interface may include a list of service level metrics for the user to choose from. If a user selects a service level metric, they may then choose a time period to implement the service level metric on the virtual machine. For example, a user may require different levels of bandwidth to be used on a virtual machine for different periods of time. Through the graphical interface, the user may be able to select a high performance level of bandwidth to be implemented during the day and a lower performance level of bandwidth to be implemented during the night. If the circumstances of the user change such that a high performance level of bandwidth is not necessary for the entire first period of time (day), the user may change the high performance level of bandwidth before the first period of time is over to a lower performance level of bandwidth. The service level metric selections made by the user as well as the implementation of the associated hypervisor weights for periods of time may be used to create a dynamic cost model.

Based upon schedules 400 and 412, a dynamic cost model may be constructed. In certain embodiments, the dynamic cost model may refer to a cost policy. The service level metrics chosen by a user may incur a dynamic charge based on the hypervisor weights assigned to the virtual machines. The dynamic charge may be correlated with a chosen service level metric as well as with the length of time a chosen service level metric is implemented. In the example above, the initial selection made by the user may incur costs associated with a high level of performance for a first period of time during the day and costs associated with a lower level of performance for a second period of time during the night. If, like the example above, a user decided to change the service level metric before the end of the first time period, the dynamic cost model associated with the initial user selections may be updated to reflect the change in performance for the service level metric and the change in the length of period of time by which the specific service level metric is implemented.

Figure 5:
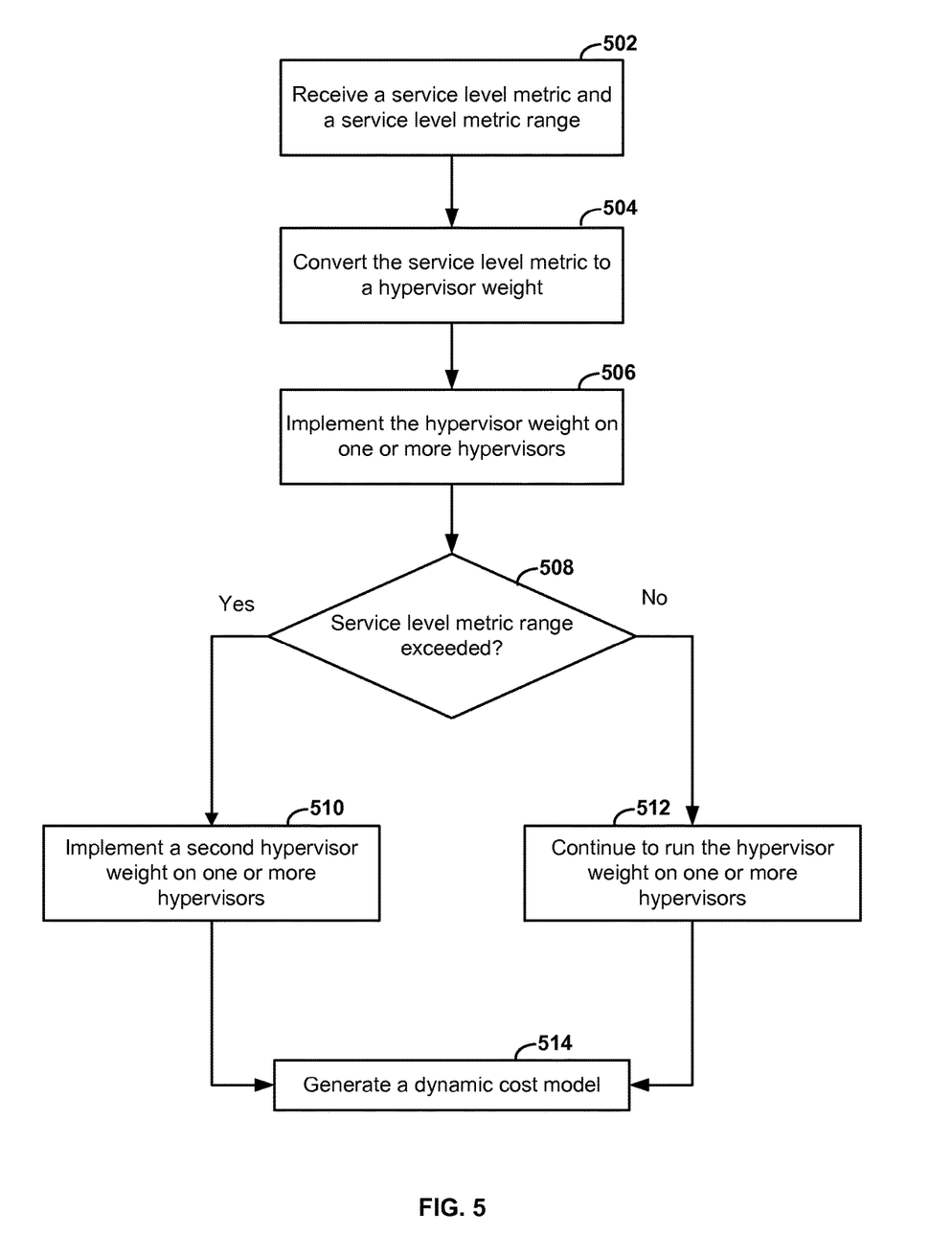
FIG. 5 illustrates a flow chart of a method for managing resources available to an application in a shared pool of configurable network computing resources.

FIG. 5 illustrates a flow chart of a method for controlling resources available to an application in a shared pool of configurable network computing resources. In process 502, a metric collector may receive one or a plurality of service level metrics and one or a plurality of service level metric ranges. A service level metric range may be correlated with a specific service level metric. In addition, a service level metric range may be an interval of time. For example, a service level metric for high performance bandwidth may only be available for a predetermined time period. In certain embodiments, the service level metric range may be user defined. The metric collector may work in a manner similar to the metric collector described in FIG. 1. In embodiments, the metric collector may include a graphical user interface and work in a manner similar to that described in FIG. 4.

In process 504, the inputted user service level metrics may be converted to hypervisor weights. The conversion may occur in a manner similar to that described in FIG. 3. When the service level metrics are converted to hypervisor weights, they may be implemented on one or more hypervisors for the duration of the service level metric range in process 506. In process 508, the system may measure the current service level metric range in order to determine if the current service level metric range exceeds the originally inputted service level metric range. In embodiments, the process 508 may continuously monitor the service level metric range. If the service level metric range has been exceeded, as described in process 510, a second hypervisor weight may be implemented on one or more hypervisors. In various embodiments, a user may define a second service level metric and service level metric range after the virtual machine has been deployed but before the first service level metric range has been exceeded.

If the service level metric range has not been exceeded, as described in process 512, the first hypervisor weight will continue to run on one or more hypervisors until the service level metric range has been exceeded or is terminated. In embodiments, if a user has previously defined a second service level metric or has inputted a second service level metric after the machine has been deployed and the first service level metric range has not been exceeded, a user may manually terminate the first service level metric and immediately implement the second service level metric without incurring downtime. In response to implementing a variety of service level metrics for service level metric ranges, a dynamic cost model may be constructed in process 514. The dynamic cost model may work in a manner similar to that described in FIG. 4. The dynamic cost model may relate to a cost policy for controlling resources available to an application in a shared pool of configurable network computing resources. The dynamic cost model may be based on the service level metrics chosen, the length of implementation of the service level metrics chosen, the allocation of resources associated with the service level metrics chosen and the number of virtual machines running the service level metrics.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
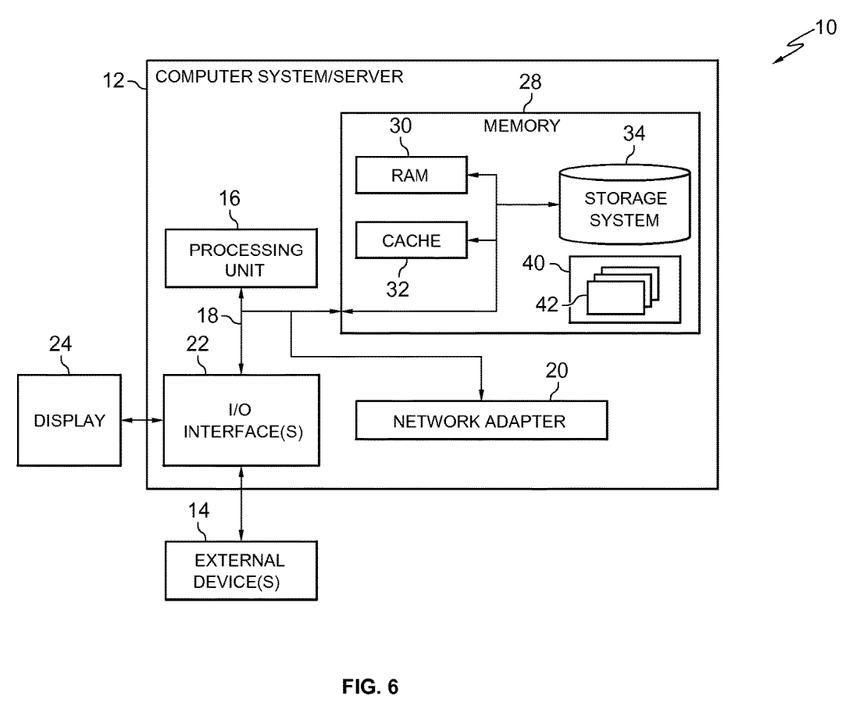
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
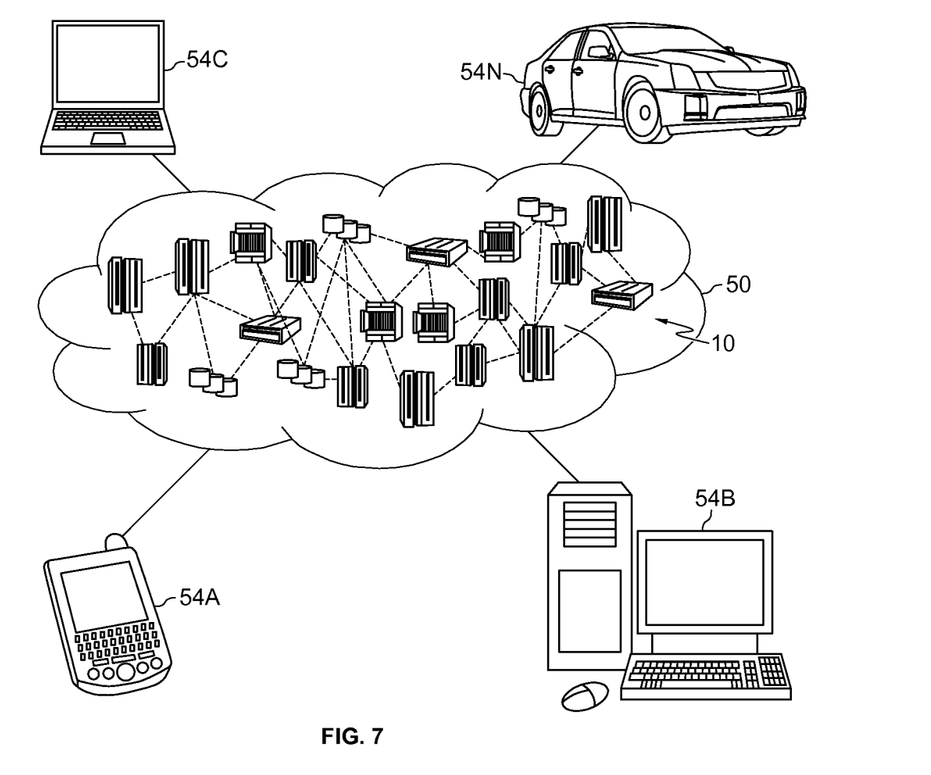
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
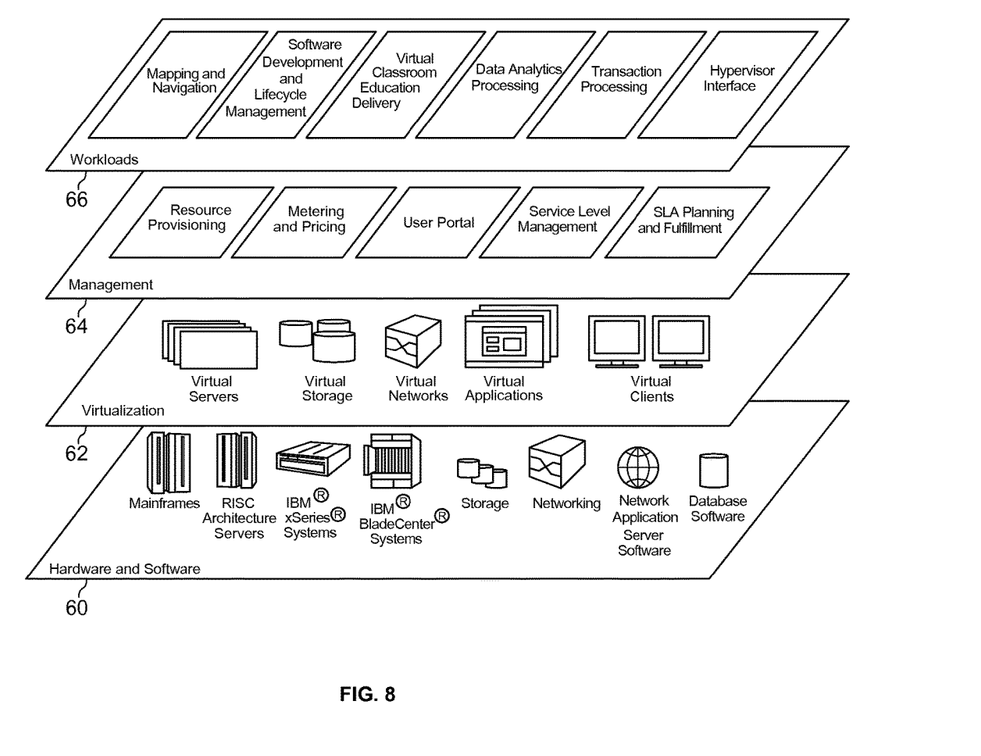
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For instance, this may include allocating computer resources according to hypervisor weights. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and hypervisor interface.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the disclosure include a method, program and system for controlling hypervisor weights in a shared pool of configurable network computing resources. The method, program and system may include a hypervisor processor receiving a service level metric threshold for a virtual machine deployed on one of a plurality of computer nodes. The service level metric threshold may include computing node utilization. The hypervisor processor may convert the service level metric threshold to a first hypervisor weight. In response to translating the service level metric threshold to the first hypervisor weight, the method, program and system may include generating a dynamic cost model. A hypervisor may be configured to operate and run a virtual machine according to the first hypervisor weight.

Aspects of the disclosure include, in response to configuring and running the hypervisor according to the first hypervisor weight on the virtual machine, compiling data associated with resource usage within the computing node. For example, data associated with resource usage may include usage of devices such as a central processing unit, a network interface controller, disk space, memory and an input/output mechanism. Compiling the data associated with resource usage within the computing node may include calculating a level of service parameter. The level of service parameter may be for a first time period. The level of service parameter may be compared with the service level metric threshold in order to determine whether the level of service parameter is outside of the service level metric threshold.

Aspects of the disclosure include further include the hypervisor processor receiving a set of data correlated to a first set of hypervisor weights within a computing node. A relationship may be analyzed between the first set of hypervisor weights and a set of data associated with resource allocation within the computing node. The relationship may be used to generate a second set of hypervisor weights. In response to generating a second set of hypervisor weights, resources within the computing node may be reallocated in a manner consistent with the second set of hypervisor weights.

Aspects of the disclosure include a method for controlling machine resources available to an application running in a virtual environment. In embodiments, a virtual environment may include a virtual machine, a logical partition (LPAR), or a workload partition (WPAR). A metric collector may receive a first service level metric for an application deployed on one of a plurality of computer nodes and a first parameter specifying a first time period. A metric translator may convert the first service level metric to a first hypervisor weight. In response to converting the first service level metric for a first hypervisor weight, a hypervisor may be configured to allocate machine resources to the virtual machine according to the first hypervisor weight, wherein the application runs in the virtual machine. In embodiments, the hypervisor may include an operating system. The hypervisor may be monitored by the operating system such that when the operating system detects that a service level metric is outside of a threshold for running the virtual environment, the hypervisor may be adjusted (and subsequently, the service level metric) by the operating system to compensate for a lack of machine resources.

While the present disclosure is not necessarily limited to such applications, various aspects of the disclosure may be appreciated through a discussion of various examples using this context.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for managing resources available to an application in a shared pool of configurable network machine resources, comprising:
    receiving, by a metric collector, a first user-selected service level metric for an application deployed on one of a plurality of computing nodes, a second user-selected service level metric for the application, a first user-selected parameter specifying a first time period, and a second user-selected parameter specifying a second time period;
    translating, by a metric translator, the first user-selected service level metric to a first hypervisor weight and the second user-selected service level metric to a second hypervisor weight, wherein the first hypervisor weight and the second hypervisor weight are adjusted by user-ranking, current hypervisor status, and performance requirements necessary for implementation of the first user-selected service level metric and the second user-selected service level metric;
    generating, in response to translating the first user-selected service level metric to a first hypervisor weight, a dynamic cost model;
    updating the dynamic cost model in response to a user changing the first user-selected service level metric before the first time period ends, wherein the first hypervisor weight is updated in response to the updating the dynamic cost model;
    configuring a hypervisor to allocate computing resources to a virtual machine according to the first hypervisor weight for the first time period and according to the second hypervisor weight for the second time period, wherein the application runs in the virtual machine during the first and second time periods; and
    allocating computing resources to the application running in the virtual machine for the first time period and for the second time period.

2. The method of claim 1, wherein the hypervisor configures allocation of computing resources to the virtual machine according to the first hypervisor weight for the first time period.

3. The method of claim 1, wherein allocating computing resources includes usage of one of the devices selected from the group consisting of a central processing unit, a network interface controller, disk space, memory or an input/output mechanism.

4. The method of claim 1, wherein the first user-selected service level metric includes a computing node utilization and uptime availability.

5. The method of claim 4, wherein the computing node utilization includes volume of usage and cost.

6. The method of claim 1, further comprising:
    generating a user profile based on data associated with a user and the received first and second user-selected service level metrics; and
    accessing the user profile to provide an option to implement the first and second user-selected service level metrics and corresponding first and second time periods for subsequent management of resources.

7. A computer program product for controlling resources available to an application in a shared pool of configurable network machine resources, the computer program product comprising a computer readable storage medium having program instructions embodied therewith, the program instructions executable by a processor to perform a method comprising:
    receiving, by a metric collector, a first user-selected service level metric for an application deployed on one of a plurality of computing nodes, a second user-selected service level metric for the application, a first user-selected parameter specifying a first time period, and a second user-selected parameter specifying a second time period;
    translating, by a metric translator, the first user-selected service level metric to a first hypervisor weight and the second user-selected service level metric to a second hypervisor weight, wherein the first hypervisor weight and the second hypervisor weight are adjusted by user-ranking, current hypervisor status, and performance requirements necessary for implementation of the first user-selected service level metric and the second user-selected service level metric;

generating, in response to translating the first user-selected service level metric to a first hypervisor weight, a dynamic cost model;

updating the dynamic cost model in response to a user changing the first user-selected service level metric before the first time period ends, wherein the first hypervisor weight is updated in response to the updating the dynamic cost model;

configuring a hypervisor to allocate computing resources to a virtual machine according to the first hypervisor weight for the first time period and according to the second hypervisor weight for the second time period, wherein the application runs in the virtual machine during the first and second time periods; and allocating computing resources to the application running in the virtual machine for the first time period and for the second time period.

8. The computer program product of claim 7, wherein the hypervisor configures allocation of computing resources to the virtual machine according to the first hypervisor weight for the first time period.

9. The computer program product of claim 7, wherein allocating computing resources includes usage of one of the devices selected from the group consisting of a central processing unit, a network interface controller, disk space, memory or an input/output mechanism.

10. The computer program product of claim 7, wherein the first user-selected service level metric includes a computing node utilization and uptime availability.

11. The computer program product of claim 10, wherein the computing node utilization includes volume of usage and cost.

12. The computer program product of claim 7, wherein the program instructions are further executable by a processor to:

generate a user profile based on data associated with a user and the received first and second user-selected service level metrics; and access the user profile to provide an option to implement the first and second user-selected service level metrics and corresponding first and second time periods for subsequent management of resources.

13. A computer system for controlling resources available to an application in a shared pool of configurable network machine resources, the computer system comprising:

a memory; and a processor in communication with the memory, wherein the computer system is configured to perform a method, the method comprising:

receiving, by a metric collector, a first user-selected service level metric for an application deployed on one of a plurality of computing nodes, a second user-selected service level metric for the application, a first user-selected parameter specifying a first time period, and a second user-selected parameter specifying a second time period;

translating, by a metric translator, the first user-selected service level metric to a first hypervisor weight and the second user-selected service level metric to a second hypervisor weight, wherein the first hypervisor weight and the second hypervisor weight are adjusted by user-ranking, current hypervisor status, and performance requirements necessary for implementation of the first user-selected service level metric and the second user-selected service level metric;

generating, in response to translating the first user-selected service level metric to a first hypervisor weight, a dynamic cost model;

updating the dynamic cost model in response to a user changing the first user-selected service level metric before the first time period ends, wherein the first hypervisor weight is updated in response to the updating the dynamic cost model;

configuring a hypervisor to allocate computing resources to a virtual machine according to the first hypervisor weight for the first time period and according to the second hypervisor weight for the second time period, wherein the application runs in the virtual machine during the first and second time periods; and allocating computing resources to the application running in the virtual machine for the first time period and for the second time period.

14. The computer system of claim 13, wherein the hypervisor configures allocation of computing resources to the virtual machine according to the first hypervisor weight for the first time period.

15. The computer system of claim 13, wherein allocating computing resources includes usage of one of the devices selected from the group consisting of a central processing unit, a network interface controller, disk space, memory or an input/output mechanism.

16. The computer system of claim 13, wherein the first user-selected service level metric includes a computing node utilization and uptime availability.

17. The computer system of claim 16, wherein the computing node utilization includes volume of usage and cost.

18. The computer system of claim 13, wherein the processor is further configured to:

generate a user profile based on data associated with a user and the received first and second user-selected service level metrics; and access the user profile to provide an option to implement the first and second user-selected service level metrics and corresponding first and second time periods for subsequent management of resources.

* * * * *